United States Patent
Lee

(10) Patent No.: US 11,014,415 B2
(45) Date of Patent: May 25, 2021

(54) PNEUMATIC TIRE FOR RESONANCE NOISE REDUCTION

(71) Applicant: HANKOOK TIRE CO., LTD., Seoul (KR)

(72) Inventor: Hyun Kyu Lee, Daejeon (KR)

(73) Assignee: HANKOOK TIRE CO., LTD., Seoul (KR)

(*) Notice: Subject to any disclaimer, the term of this patent is extended or adjusted under 35 U.S.C. 154(b) by 242 days.

(21) Appl. No.: 15/366,645

(22) Filed: Dec. 1, 2016

(65) Prior Publication Data

US 2017/0157997 A1    Jun. 8, 2017

(30) Foreign Application Priority Data

Dec. 7, 2015 (KR) .................. 10-2015-0173116

(51) Int. Cl.
*B60C 19/00* (2006.01)
*B60C 5/14* (2006.01)
*B29D 30/00* (2006.01)
*B29D 30/06* (2006.01)
*B29D 30/12* (2006.01)

(52) U.S. Cl.
CPC ........ *B60C 19/002* (2013.01); *B29D 30/0061* (2013.01); *B29D 30/0606* (2013.01); *B29D 30/0661* (2013.01); *B29D 30/0681* (2013.01); *B29D 30/12* (2013.01); *B60C 5/14* (2013.01); *B29D 2030/0682* (2013.01)

(58) Field of Classification Search
CPC ................................ B60C 19/002; B60C 5/14
See application file for complete search history.

(56) References Cited

U.S. PATENT DOCUMENTS

2005/0155686 A1*  7/2005  Yukawa ................ B60C 19/002
2008/0099117 A1   5/2008  Tanno
2010/0043937 A1   2/2010  Matsunaga et al.
2011/0220264 A1   9/2011  Nagai

FOREIGN PATENT DOCUMENTS

| DE | 102009036460 A1 | 2/2010 |
| EP | 1253025 A2 | 10/2002 |
| JP | 2007062541 A * | 3/2007 |
| JP | 2007168541 A | 7/2007 |
| JP | 2010047074 A | 3/2010 |
| JP | 2011189796 A | 9/2011 |
| JP | 2014151875 A | 8/2014 |
| JP | 5612055 B2 | 10/2014 |

OTHER PUBLICATIONS

English machine translation of JP 2007-62541 A, Mar. 15, 2007.*
English machine translation of JP 2007-168541 A, Jul. 5, 2007.*
Extended European Search Report issued in European Application No. 16202373.5, dated May 8, 2017.

* cited by examiner

*Primary Examiner* — Adrienne C. Johnstone
(74) *Attorney, Agent, or Firm* — Marshall, Gerstein & Borun LLP

(57) ABSTRACT

A pneumatic tire for resonance noise reduction, which includes a plurality of resonance noise-reducing members that are disposed along the circumferential direction of the inner liner of a tire, and are formed to protrude from the inner liner so as to reduce the interference of the resonance noises generated inside the tire. The resonance noise-reducing members are formed at an irregular interval of disposition along the circumferential direction of the inner liner.

5 Claims, 3 Drawing Sheets

PNEUMATIC TIRE FOR RESONANCE NOISE REDUCTION

TECHNOLOGICAL FIELD

The present description relates to a pneumatic tire for resonance noise reduction and a method for manufacturing the same. More particularly, the description relates to a pneumatic tire for resonance noise reduction, which is capable of reducing the intensity of the resonance noise generated inside a tire, and a method for manufacturing the same.

BACKGROUND

Generally, one of the causes for the generation of tire noise is the cavity resonance noise generated by vibration of the air filling the interior of a tire. The tire cavity resonance noise is generated when the tread part of a tire touching the road surface during vehicle driving vibrates due to the unevenness of the road surface, and this vibration again vibrates the air inside the tire cavity.

The frequency of the sound perceived as noises in the cavity resonance noise may vary depending on the size of the tire; however, the frequency of the noise is generally known to be near 200 Hz to 300 Hz. Accordingly, reducing the noise level in this frequency region may be considered as a key solution for reducing the tire noises.

Furthermore, the cavity resonance noise in a tire may vary depending on the size of the cavity formed by the tire and the rim. A variety of technologies for reducing the tire resonance noise have been hitherto suggested in order to regulate the size of the cavity and to reduce the cavity resonance noise, and such technologies include attaching a sound absorbing material inside the tire, and attaching a sound absorbing material on the rim surface.

Among them, the low-noise pneumatic tire according to Korean Unexamined Patent Application No. 10-2007-0029652 employs a system in which the noise generated in the internal cavity of a tire by attaching a sound absorbing material in the interior of the tire. However, the low-noise pneumatic tire disclosed in Korean Unexamined Patent Application No. 10-2007-0029652 has a problem that the sound absorbing material should be separately attached to the interior of the tire after tire production, and the sound absorbing material may fall off during driving due to impact or the like.

SUMMARY OF THE DISCLOSURE

An object of the presently described embodiments is to provide a pneumatic tire for resonance noise reduction, which has a plurality of resonance noise-reducing members integrally formed on the inner liner of the tire and can thereby reduce the interference of the resonance noise generated inside the tire, and a method for manufacturing the pneumatic tire.

In order to achieve the object described above, a pneumatic tire for resonance noise reduction according to an aspect includes a plurality of resonance noise-reducing members that are disposed along the circumferential direction on the inner liner of the tire, and are formed to protrude from the inner liner so as to reduce the interference of the resonance noise generated inside the tire. The resonance noise-reducing members are formed along the circumferential direction of the inner liner at an irregular interval of disposition.

Here, the resonance noise-reducing members are disposed on the inner liner at an irregular interval of disposition that divides the interior of the tire into eight segments, and the angles of division may be formed to be 41.5° to 48.5°.

Here, the resonance noise-reducing members may be formed to protrude to a height of 20 mm or more from the surface contacting the inner liner.

Here, the resonance noise-reducing members may be formed to have a thickness of 2 mm or more.

Here, the resonance noise-reducing members may be formed from the same material as the material of the inner liner.

A method for manufacturing a pneumatic tire for resonance noise reduction according to another aspect includes a torus drum forming step, a tire vulcanization preparation step, and a resonance noise-reducing member forming step. In the torus drum forming step, a plurality of segments each equipped with a rubber pass line that is formed to protrude from the inner circumferential surface, are combined to form a cylindrically shaped torus drum. In the tire vulcanization preparation step, the torus drum is disposed on the inner side of the tire, and preparations for vulcanization are made. In the resonance noise-reducing member forming step, the tire is vulcanized to cause rubber to flow into the rubber pass lines, and thus resonance noise-reducing members that reduce resonance noise are formed on the outer circumferential surface of the inner liner. The rubber pass lines are disposed at an irregular interval of disposition along the circumferential direction of the inner liner.

Here, the resonance noise-reducing members may be formed from the same material as the material of the inner liner.

According to the pneumatic tire for resonance noise reduction of the presently described embodiments and the method for manufacturing the same, since resonance noise-reducing members are integrally formed on the inner liner of a tire, the resonance noise-reducing members can be prevented from falling off from the tire even during high-speed driving of the vehicle. Also, the resonance occurring inside the tire can be reduced by reducing the phenomenon of resonant vibration occurring inside the tire, and thus safe driving can be realized, with reduced disturbances caused by noises made during vehicle driving.

DETAILED DESCRIPTION

Hereinafter, preferred embodiments will be described in detail with reference to the attached drawings. Here, it should be noted that the same constituent elements shown in the attached drawings are respectively represented by the same symbols as far as possible. Furthermore, any detailed explanations concerning known functions and configurations, which may make the gist of the presently described embodiments ambiguous, will not be given. For a similar reason, some constituent elements shown in the attached drawings will be exaggerated, omitted, or schematically illustrated.

Furthermore, throughout the specification, when it is said that a certain part "includes" a certain constituent element, unless particularly stated otherwise, this means that the relevant part may further include other constituent elements, rather than excluding other constituent elements. Furthermore, throughout the specification, the term "(disposed) on" means that a subject is located on or under an object of interest, and this does not necessarily mean that the subject is located on the upper side with respect to the direction of gravity.

Figure 1:
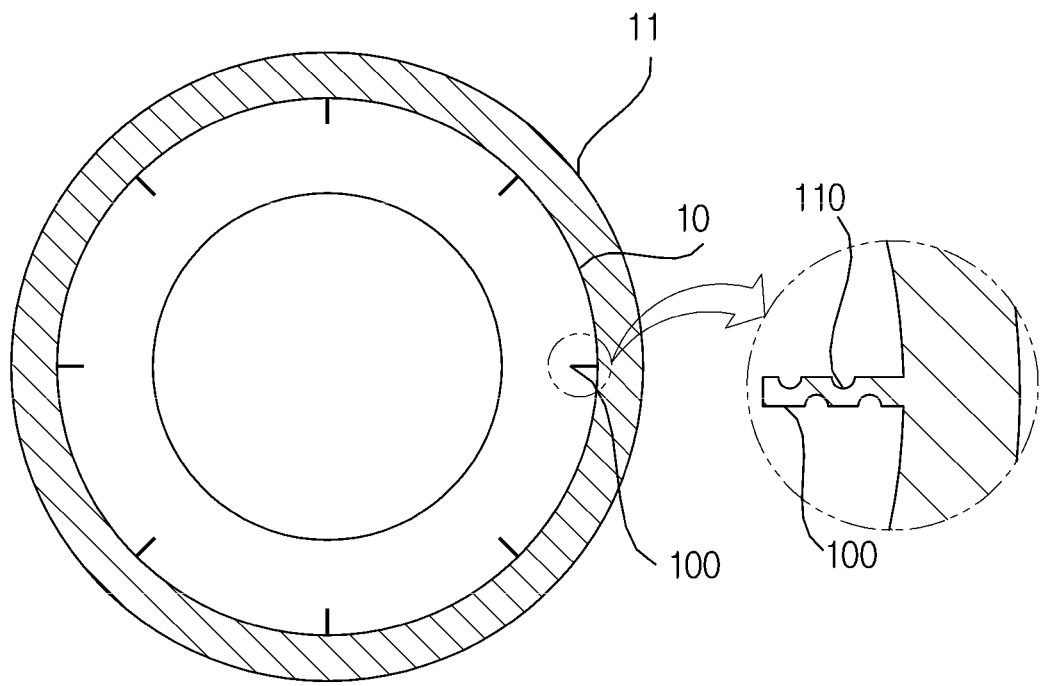
FIG. 1 is a conceptual cross-sectional view diagram of a pneumatic tire for resonance noise reduction according to an embodiment.
Figure 2:
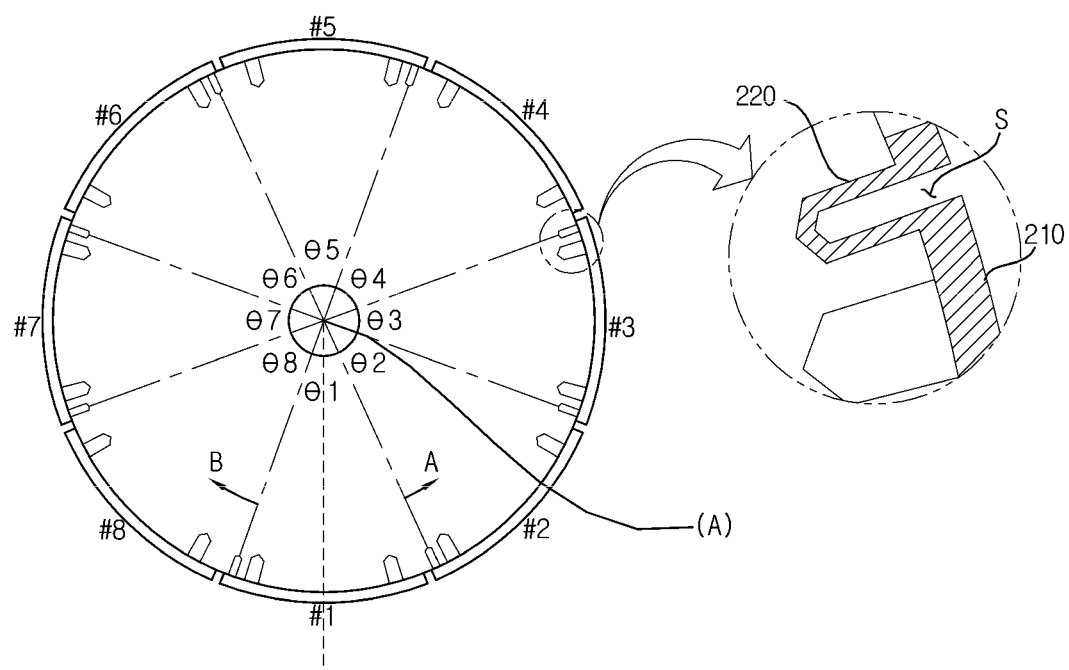
FIG. 2 is a lateral view diagram illustrating the disposition of segments of the torus drum according to an embodiment.
Figure 3:
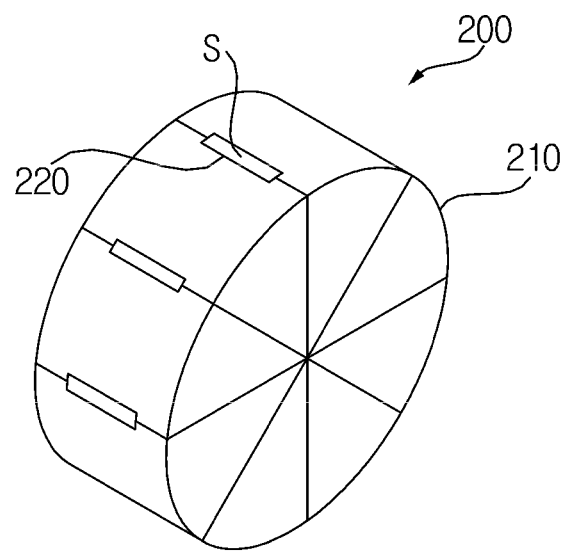
FIG. 3 is a perspective view diagram illustrating the torus drum according to the embodiment being disposed in a combined form.

FIG. 1 is a conceptual cross-sectional view diagram of a pneumatic tire for resonance noise reduction according to an embodiment, FIG. 2 is a lateral view diagram illustrating the disposition of segments of the torus drum according to an embodiment, and FIG. 3 is a perspective view diagram illustrating the torus drum according to the embodiment being disposed in a combined form.

As illustrated in FIG. 1 to FIG. 3, the pneumatic tire for resonance noise reduction according to the embodiment is configured to include a plurality of resonance noise-reducing members (100) disposed on the outer circumferential surface of an inner liner (10).

The resonance noise-reducing members (100) are disposed at multiple positions along the circumferential direction of the inner liner (10), and are integrally formed to protrude from the inner liner. At this time, the resonance noise-reducing members (100) are disposed along the circumferential direction of the inner liner (10) and are formed to protrude to a height of 20 mm or more and to have a thickness of 2 mm or more. The resonance noise-reducing members may be arranged along the width direction of the tread (11). Here, the length in the width direction of the resonance noise-reducing member (100) can be varied according to the size and shape of the tire, and the length in the width direction is not limited to this.

Since the resonance noise-reducing members (100) thus formed are integrated with the inner liner (10), the resonance noise-reducing members are firmly supported without falling off due to the impact transferred from high-speed driving or the road surface, and thus safe driving can be realized. Furthermore, since the resonance noise-reducing members (100) are small and light compared to the resonance noise-reducing members of the prior art technology that are attached along the outer circumferential surface of the inner liner, the fuel efficiency of the vehicle and the ride comfort can be enhanced.

The resonance noise-reducing members (100) may have a plurality of grooves (110) formed along the width direction of the tread (11). At this time, the multiple grooves (110) are arranged in a staggered manner on one side and the other side, and further reduce the phenomenon of resonant vibration caused by the noises generated inside the tire. Thus, the grooves can increase the effect of reducing resonance noise, and can enhance silence during driving.

The resonance noise-reducing members (100) can be formed by the rubber pass lines (220) that are provided in the segments (210) forming the torus drum (200). Here, there are eight segments (210) that form the torus drum (200), and the respective segments (210) can be formed around the shaft (A) at angles that are different from each other, as indicated in Table 1. As a result, the torus drum (200) formed by the segments (210) combined together has eight rubber pass lines (220).

TABLE 1

| Sector | Reference | A | B |
|---|---|---|---|
| #1 | 41.5 | −0.25~+1.75 | −0.25~+1.75 |
| #2 | 45 | −0.25~+1.75 | −1.75~+0.25 |
| #3 | 45 | −0.25~+1.75 | −1.75~+0.25 |
| #4 | 48.5 | −1.75~+0.25 | −1.75~+0.25 |
| #5 | 45 | −1.75~+0.25 | −0.25~+1.75 |
| #6 | 45 | −1.75~+0.25 | −0.25~+1.75 |
| #7 | 41.5 | −0.25~+1.75 | −0.25~+1.75 |
| #8 | 48.5 | −1.75~+0.25 | −1.75~+0.25 |

At this time, the rubber pass lines (220) are formed to protrude from the inner circumferential surface of the segments (210) toward the direction of the rotating shaft of the vehicle, and a space (S) is formed inside each rubber pass line so that rubber can flow into the space. Therefore, when the torus drum (200) is disposed so as to face the inner liner (10) inside the tire, and then the tire is vulcanized, rubber flows into the space (S) formed in the rubber pass lines (220) formed in the segments (210), and the resonance noise-reducing members (100) are formed to protrude from the outer circumferential surface of the inner liner (10).

Regarding the resonance noise-reducing members (100), eight units are formed inside the tire by the multiple rubber pass lines (220) provided on the torus drum (200). At this time, the resonance noise-reducing members (100) are not disposed at an equal interval, and are disposed irregularly at an angle in the range of 41.5° to 48.5°, as illustrated in Table 1.

As such, since the resonance noise-reducing members (100) are disposed irregularly inside the tire, the phenomenon of resonant vibration caused by the noises generated inside the tire is further reduced, the effect of reducing resonance noise is enhanced, and thus, silence during driving can be enhanced.

Since the resonance noise-reducing members (100) are formed integrally with the inner liner (10) at the time of vulcanization of the tire, the resonance noise-reducing members (100) are preferably formed from the same material as the material of the inner liner. Various materials that can be formed integrally with the inner liner (10) can be selectively applied.

Furthermore, regarding the interval of arrangement along the circumferential direction of the resonance noise-reducing members (100), as shown in Table 1, the resonance noise-reducing members may be arranged so as to have deviations in a certain range with respect to a reference angle in the counterclockwise direction (direction A) or in the clockwise direction (direction B). As such, the irregularly formed resonance noise-reducing members (100) reduce the phenomenon of resonant vibration caused by the noises generated inside the tire, and silence during driving can be enhanced.

In the present embodiment, an example in which the resonance noise-reducing members (100) are divided into eight parts inside the tire and are disposed on the inner liner (10) has been described for illustrative purposes; however, the resonance noise-reducing members (100) can be formed in eight or more divisions, or in eight or fewer divisions, and the number of divisions is not intended to be limited to this. The number of divisions may vary depending on the size or shape of the tire.

Figure 4:
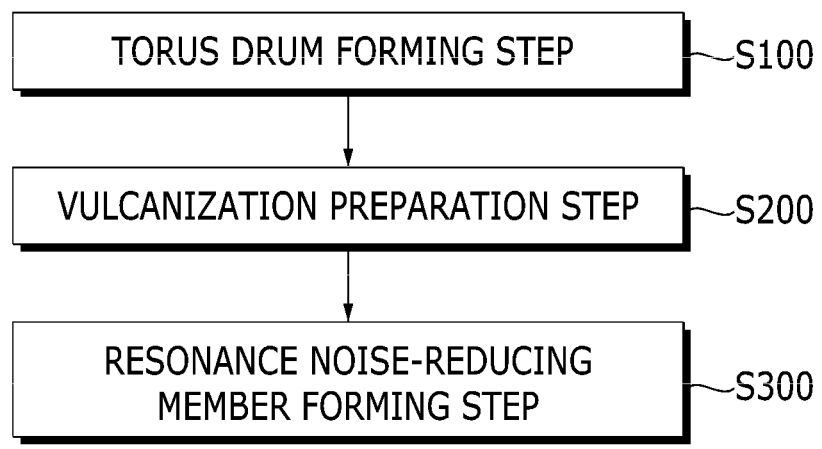
FIG. 4 is a production process flow diagram illustrating the method for manufacturing a pneumatic tire for resonance noise reduction according to an embodiment.

FIG. 4 is a production process flow diagram illustrating the method for manufacturing a pneumatic tire for resonance noise reduction according to an embodiment.

As illustrated in FIG. 4, the method for manufacturing a pneumatic tire for resonance noise reduction according to the embodiment includes a torus drum forming step (S100), a vulcanization preparation step (S200), and a resonance noise-reducing member forming step (S300). Now, the method will be explained with reference to FIG. 1 to FIG. 3.

The torus drum forming step (S100) is a step of assembling a plurality of segments (200) provided with the rubber pass lines (210) that are formed to protrude from the inner circumferential surface, into a cylindrical shape. At this time, the size of the torus drum may vary depending on the size of the tire.

The tire vulcanization preparation step (S200) is a step of disposing the torus drum formed into a cylindrical shape on the inner side of the tire, and making preparations for vulcanization.

The resonance noise-reducing member forming step (S300) is a step of vulcanizing the tire, and thereby forming resonance noise-reducing members (100) along the rubber pass lines provided on the torus drum. At this time, the resonance noise-reducing members (100) are formed at an irregular interval of disposition on the inner circumferential surface of the tire, and the resonance noise reducing effect can be enhanced. When the formation of the resonance noise-reducing members is completed, the torus drum is separated, and thus, production of a tire having resonance noise-reducing members formed therein can be completed.

Figure 5:
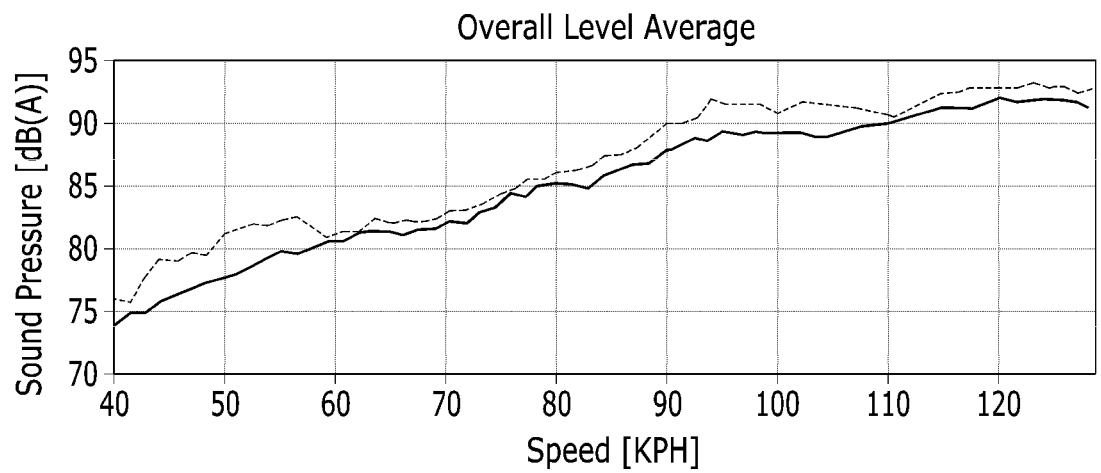
FIG. 5 is a graph showing the experimental results for the noises generated in different speed ranges during city driving using the pneumatic tire for resonance noise reduction according to the embodiment.
Figure 6:
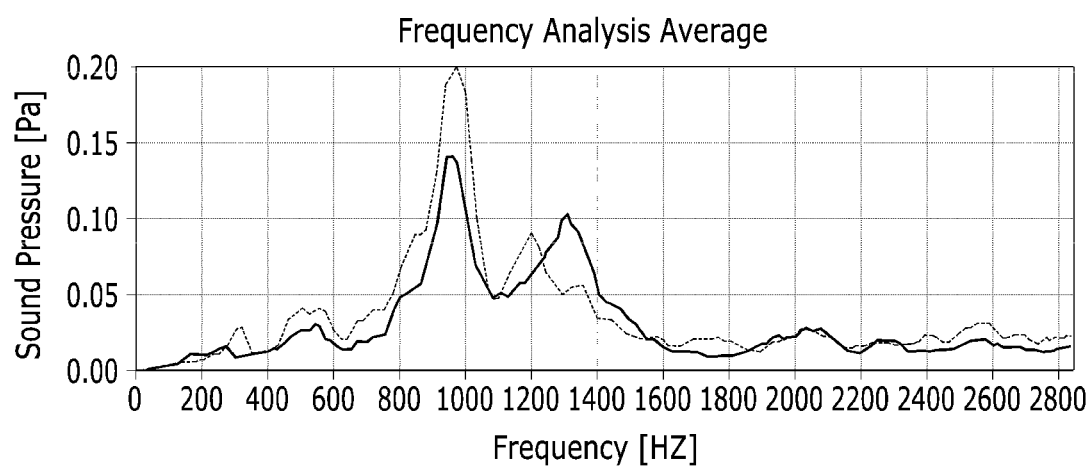
FIG. 6 is a graph showing the experimental results for the sound pressure level at different frequencies generated during city driving using the pneumatic tire for resonance noise reduction according to the embodiment.

FIG. 5 is a graph showing the experimental results for the noises generated in different speed ranges during city driving using the pneumatic tire for resonance noise reduction according to the embodiment, and FIG. 6 is a graph showing the experimental results for the sound pressure level at different frequencies generated during city driving using the pneumatic tire for resonance noise reduction according to the embodiment.

As illustrated in FIG. 5 and FIG. 6, the tire for resonance noise reduction according to the embodiment exhibited an effect in which the noises generated in a speed range of 50 to 60 KPH (km/hour), which is a practical speed range during city driving, decreased by about 3 to 4 dB. Furthermore, the tire exhibited an effect of reducing the tire resonance noise in the region of 300 to 400 Hz. That is, it is speculated that the sound waves causing the noises generated inside a tire are reverberated by the resonance noise-reducing members, and the phenomenon of resonance occurring at the same frequency is reduced. Therefore, no additional post-treatments such as attachment of sound absorbing materials or the like are needed, and thus, the productivity for tire production can be increased.

Meanwhile, the embodiments disclosed in the present specification and drawings have been suggested only for the purpose of explaining the technical matters and assisting the understanding, and the embodiments are not intended to limit the scope of the claims. It should be obvious to those having ordinary skill in the relevant art, that in addition to the embodiments disclosed herein, other modifications and variations based on the technical ideas herein are also included in the scope.

What is claimed is:

1. A pneumatic tire for resonance noise reduction, comprising:
    an inner liner; and
    a plurality of resonance noise-reducing members disposed along the circumferential direction of the inner liner of the tire, the resonance noise-reducing members being formed to protrude from the inner liner and reducing the interference of the resonance noises generated inside the tire,
    wherein the resonance noise-reducing members are formed at an irregular interval of disposition along the circumferential direction of the inner liner, the resonance noise-reducing members being arranged so as to extend in the tire width direction,
    wherein a surface of each resonance noise-reducing member in a section parallel to the circumferential direction of the tire has two radially extending sides directly adjacent to the inner liner and one side connecting the two radially extending sides, and
    wherein each of the two radially extending sides has a plurality of grooves each extending in the tire width direction, the grooves on one of the two radially extending sides directly adjacent to the inner liner being arranged in a radially staggered manner with respect to the grooves on the other of the radially extending sides.

2. The pneumatic tire for resonance noise reduction according to claim 1, wherein the resonance noise-reducing members consist of eight members that are disposed on the inner liner forming eight segments dividing the interior of the tire, each segment boundary radius bisecting the circumferential thickness of a respective noise-reducing member on the surface contacting the inner liner, and
    the angles of division are formed such that the smallest angle of division is 41.5° and the largest angle of division is 48.5°.

3. The pneumatic tire for resonance noise reduction according to claim 1, wherein the resonance noise-reducing members are formed to protrude to a height of 20 mm or more from the surface contacting the inner liner.

4. The pneumatic tire for resonance noise reduction according to claim 1, wherein the resonance noise-reducing members are formed to have a thickness of 2 mm or more.

5. The pneumatic tire for resonance noise reduction according to claim 1, wherein the resonance noise-reducing members are formed from the same material as the material of the inner liner.

* * * * *